United States Patent
Poirier et al.

(10) Patent No.: US 6,341,219 B1
(45) Date of Patent: Jan. 22, 2002

(54) SINGLE-SOURCE AUTOMATIC POWER CONTROL METHOD AND APPARATUS FOR FREQUENCY-DIVERSE VARIABLE-GAIN STAGES OF A CDMA CELLULAR HANDSET

(75) Inventors: John R. Poirier, Gilbertsville; Christopher J. Strobel, Barto, both of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/244,858

(22) Filed: Feb. 5, 1999

(51) Int. Cl.⁷ .................................................. H04B 1/04
(52) U.S. Cl. ...................... 455/116; 455/127; 330/279; 370/342
(58) Field of Search .................................. 455/127, 115, 455/116, 126, 91, 572; 375/297; 330/278, 279; 370/335, 342

(56) References Cited

U.S. PATENT DOCUMENTS

| | | | | |
|---|---|---|---|---|
| 5,307,512 A | * | 4/1994 | Mitzlaff | 455/127 |
| 5,446,920 A | * | 8/1995 | Matsumoto et al. | 455/127 |
| 5,604,924 A | * | 2/1997 | Yokoya | 455/127 |
| 5,862,460 A | * | 1/1999 | Rich | 455/116 |
| 5,926,749 A | * | 7/1999 | Igarashi et al. | 455/127 |
| 5,995,853 A | * | 11/1999 | Park | 455/115 |
| 6,075,978 A | * | 6/2000 | Tsumura | 455/234.1 |

* cited by examiner

Primary Examiner—Edward F. Urban
(74) Attorney, Agent, or Firm—Dickstein Shapiro Morin & Oshinsky LLP

(57) ABSTRACT

An automatic and adjustable power control method and apparatus for optimally controlling the output power of a CDMA handset is provided. The method and apparatus utilize a single control signal to automatically control the gain of two frequency diverse variable gain stages of a transmitting portion of the handset by a multi-point hand-off technique. The multi-point hand-off technique partially varies the gain of a first stage to satisfy key system constraints and hands-off control to a second stage. The gain of the second stage is varied to satisfy additional system constraints. A second hand-off is performed so that the gain of the first stage may be varied again to maintain the optimal power control.

62 Claims, 4 Drawing Sheets

SINGLE-SOURCE AUTOMATIC POWER CONTROL METHOD AND APPARATUS FOR FREQUENCY-DIVERSE VARIABLE-GAIN STAGES OF A CDMA CELLULAR HANDSET

BACKGROUND OF THE INVENTION

1. Field of the Invention

The present invention relates to the field of wireless communications and, more particularly to a single-source frequency diverse power control method and apparatus for CDMA wireless cellular handsets.

2. Description of the Related Art

Code Division Multiple Access (CDMA) transmission schemes have become increasingly popular due to the recent growth of the cellular industry. CDMA is a spread spectrum technique whereby data signals are modulated by a pseudo-random signal, known as a spreading code, before transmission. The modulation of the data signals spreads the spectrum of the signals and makes them appear like noise to an ordinary receiver. When the same pseudo-random signal is used to demodulate (despread) the transmitted data signal at the CDMA receiver, the data signal can be easily recovered.

Currently, there exists an industry standard requiring CDMA handset transmitters to achieve a minimum of 73 dB of output power control. As is known in the art, the terms "gain control" and "power control" may be used synonymously since gain can be translated into power at any point during the transmit chain. The maximum required gain minus the minimum required gain is often referred to as gain range. In practice, the circuit components employed to achieve this output power control must also achieve additional power control to compensate for device, frequency, mode and temperature variations. These variations increase the minimum output power control of the components used in the CDMA transmitter to slightly over 100 dB of gain range.

FIG. 1 illustrates a typical transmit chain 100 used in a CDMA handset transmitter. The transmit chain 100 includes a digital-to-analog converter (DAC) 102, modulator 104, an intermediate frequency (IF) stage 116 and a radio frequency (RF) stage 118. The IF stage 116 includes an IF amplifier 106 and an IF filter 108. The RF stage 118 includes a RF upconverter 110, oscillator 112 and RF amplifier 114.

The DAC 102 receives digital baseband data from a remaining portion of the CDMA handset. Typically, the baseband data is received from a microcontroller or processor, such as a digital signal processor, responsible for controlling the operation of the handset. The baseband data is comprised of two signals known in the art as the in-phase I and quadrature Q signals. The DAC 102 converts the digital baseband data into analog I and Q signals and outputs the analog I and Q signals to the modulator 104.

The modulator 104 inputs the analog I and Q signals, combines and modulates the signals into one IF signal which output to the IF amplifier 106. The IF amplifier 106 has a gain controlled by a control signal. The IF amplifier 106 amplifies the IF signal and outputs it to the IF filter 108. The IF filter 108 filters out any noise from the amplified IF signal and outputs the filtered IF signal to the RF upconverter 110. As known in the art, the upconverter 110 converts the amplified IF signal into a RF signal. This conversion is controlled in part by the oscillator 112 connected to the upconverter 110. The RF signal is output by the upconverter 110 to the RF amplifier 114. The RF amplifier 114 has a gain controlled by a control signal. The RF amplifier 114 amplifies the RF signal such that the transmission power of the RF signal has the desired output power. This signal would then be supplied to an antenna where it is radiated to a CDMA base station.

Allocation of both gain and gain range through the transmit chain 100 results from tradeoffs based on the noise performance, linearity, current consumption and isolation issues of the chain 100. Noise performance and linearity are known to have the biggest impact on system performance.

A CDMA system or handset is a full duplex system, that is, both the transmitter and receiver are operating simultaneously. In a CDMA handset, the transmit chain 100 must be designed to eliminate noise appearing at the receiver frequency band. This noise would interfere with a RF received signal. Therefore, the design of the transmitter must be such that its thermal noise is much lower than the thermal noise generated in the receiver. It is this constraint which drives the noise figure requirements, the IF gain allocation and is a critical factor in determining the electrical characteristics of the IF filter 108. The high gain range is the constraint which forces the output power control to be performed across the two stages 116 (i.e., a two-stage power or gain control), 118 as opposed to being performed in either the RF or IF stage (i.e., a one stage power or gain control).

Today, almost all power control is performed via a two-stage power control having a variable gain. Typically, these methods utilize separate signals to control the gain of the two stages. It is desirable, however, to control the two frequency-diverse variable-gain stages (i.e., the IF and RF stages) with a single control signal. The use of one control signal would greatly enhance the overall handset design and circuitry by simplifying the interface between the transmit chain and the handset micro-controller. This would improve the cost associated with manufacturing the handset as well as its performance.

FIG. 2 is a block diagram illustrating an exemplary automatic and adjustable power control (APC) circuit 120 for controlling the two frequency-diverse variable-gain stages (i.e., the IF and RF stages 116, 118) of the transmit chain with a single APC control signal VapcMaster. The APC circuit 120 is implemented either in analog or digital circuitry. As shown in FIG. 2, the APC circuit 120 utilizes the VapcMaster signal to generate a first signal $Vapc_{IF}$ to control the gain of the IF amplifier 106 and a second signal $Vapc_{RF}$ to control the gain of the RF amplifier 114. The VapcMaster signal is an analog voltage level whose amplitude is output by the handset micro-controller. As described below, this signal is used by the APC circuit 120 to generate the $Vapc_{IF}$ and $Vapc_{RF}$ control signals which are then respectively applied to the IF and RF amplifiers 106, 114. In most wireless handset applications, the VapcMaster signal will be approximately 2.0 volts at maximum.

One method of controlling the gains of the IF and RF stages 116, 118 is by a sequential control method. This sequential control method varies the gain of one of the stages over the stages entire gain range prior to "handing off" the power control to the other stage. For example, the method would begin by varying the gain of the RF stage over the entire RF stage gain range. When this is complete, the method would continue by varying the gain of the IF stage over the entire IF stage gain range. During this method, the total gain $G_{Tot}$, which is the addition of the gains of the IF and RF stages, must remain within the required gain range. The gain control of the sequential method is performed by the APC circuit as follows:

$G_{Tot}=G_{IF}+G_{RF}=Vapc_{IF}*GS_{IF}+Vapc_{RF}*GS_{RF}$, where $Vapc_{IF}$=VapcMaster, $Vapc_{RF}$=$Vapc_{RF-min}$ when $VapcMaster_{Min}$<VapcMaster<APC Handoff Level, $Vapc_{IF}$=$Vapc_{IF-max}$, $Vapc_{RF}$=VapcMaster when APC Handoff Level<VapcMaster<$VapcMaster_{Max}$, $GS_{IF}$=the gain slope of the IF stage in dB/V=(total gain range of IF stage)/(control range of the IF stage in Volts) and $GS_{RF}$=the gain slope of the RF stage in dB/V=(total gain range of RF stage)/(control range of the RF stage in Volts).

It must be noted that the APC Handoff Level is a voltage level of the APC control signal VapcMaster at which the RF gain range has been completely exercised. Once the Vapc-Master reaches the APC Handoff Level, the sequential method begins to exercise the gain of the IF stage over its entire gain range.

A second method of controlling the gains of the IF and RF stages 116, 118 is by a simultaneous control method. In the simultaneous control method the control lines for the RF and IF stages 118, 116 are both tied to the master control signal VapcMaster. Both stages 116, 118 would operate independently of each other since each stage's control voltage $Vapc_{IF}$, $Vapc_{RF}$ equals the master control signal VapcMaster. During this method, the total gain $G_{Tot}$, which is the addition of the gains of the IF and RF stages, must remain within the required gain range. The gain control of the simultaneous method is performed by the APC as follows:

$G_{Tot}$=$G_{IF}$+$G_{RF}$=$Vapc_{IF}$*$GS_{IF}$+$Vapc_{RF}$*$GS_{RF}$, where $Vapc_{IF}$=$Vapc_{RF}$=VapcMaster, $GS_{IF}$=the gain slope of the IF stage in dB/V=(total gain range of IF stage)/(control range of the IF stage in Volts), $GS_{RF}$=the gain slope of the RF stage in dB/V=(total gain range of RF stage)/(control range of the RF stage in Volts) and $GS_{IF}$=$GS_{RF}$ is not generally true.

It must be noted that the simultaneous method does not hand-off control as performed by the sequential method. Accordingly, there is no APC Handoff Level for VapcMaster in the simultaneous method.

A third possible gain control method would utilize a combination of the sequential and simultaneous methods. This would be difficult to implement, however, since simultaneous control requires $Vapc_{IF}$=$Vapc_{RF}$ while the sequential methods requires the two control voltages $Vapc_{IF}$ and $Vapc_{RF}$ to be independent of each other.

These methods, however, have some shortcomings which will become evident after a brief description of four major transmit chain design constraints. The first constraint (hereinafter referred to as "constraint #1") mandates that as the gain is lowered, the current consumption must also be lowered. This allows for battery conservation and is easily implemented as part of the APC control scheme. For power conservation reasons, the stage which consumes more power ideally has its gain lowered first so that the circuitry reduces its current consumption as quickly as possible when the total gain is reduced from its maximum. This will be the RF stage in most transmit chains architectures.

The second constraint (hereinafter referred to as "constraint #2") mandates that, for noise reasons, it is desirable to lower the gain of the RF stage since it makes a greater contribution to the output noise floor.

The third constraint (hereinafter referred to as "constraint #3") mandates that, for linearity reasons, it is desirable to lower the gain of the IF stage first since its output feeds the RF stage in a cascaded manner. A lowering of the IF input to the RF stage without lowering the operating point of the RF stage allows the RF stage to operate in a more linear fashion, since the output power level is farther away from the non-linear range.

The fourth constraint (hereinafter referred to as "constraint #4") mandates that, to compensate for variations in power levels along the transmit chain, it is desirable to extend both the IF and RF gain ranges. The extension of the IF gain range beyond what is required by the system specification indicates that under some conditions the IF output power will overdrive the RF stage causing non-linear operation and non-compliant adjacent channel emissions.

When compared with these designs constraints, it is evident that an RF-first sequential method would satisfy constraints #1 and #2 only while an IF-first sequential method would satisfy constraints #3 and #4 only. The simultaneous method would compromise all four of the constraints without properly satisfying any of them. The compromise method would be difficult to implement and would not optimize system performance with respect to the four design constraints. Accordingly, there is a desire and need for a power control scheme for a CDMA handset that utilizes a single control signal and provides optimal output power control.

SUMMARY OF THE INVENTION

In view of the foregoing shortcomings, and for other reasons, the present invention is directed to a CDMA cellular handset with a simplified design for optimally controlling the output power of the handset. The invention comprises an automatic and adjustable power control method and apparatus that utilizes a single control signal to control two frequency diverse variable gain stages of a transmitting portion of the handset by a multi-point hand-off technique.

In one aspect of the present invention, an automatic and adjustable output power control method for a telephone handset is provided. The method includes the steps of providing a control signal; altering a gain of a first transmitting stage of the handset to satisfy at least one system parameter in response to a first variation of the control signal; altering a gain of a second transmitting stage of the handset to satisfy at least one additional system parameter in response to a second variation of the control signal; and varying the altered gain of the first transmitting stage in response to a third variation of the control signal.

In another aspect of the present invention, an apparatus for providing automatic and adjustable output power control to a transmitting portion of a telephone handset is provided. The apparatus includes a controller coupled to the transmitting portion of the handset. The controller receives a control signal from a second portion of the handset and: altering a gain of a first transmitting stage of the transmitting portion to satisfy at least one system parameter in response to a first variation of said control signal; altering a gain of a second transmitting stage of the transmitting portion to satisfy at least one additional system parameter in response to a second variation of said control signal; and varying said altered gain of the first transmitting stage in response to a third variation of said control signal.

In yet another aspect of the present invention, a telephone handset is provided. The handset includes a first controller providing a control signal; a transmitting circuit, said transmitting circuit including first and second transmitting stages, said transmitting circuit having an output power; and a power control circuit coupled to said transmitting circuit and said first controller. The power control circuit includes a second controller coupled to said first and second transmitting stages receiving said control signal from said first controller, said controller: altering a gain of said first transmitting stage to satisfy at least one system parameter in response to a first variation of said control signal; altering a gain of said second transmitting stage to satisfy at least one additional system parameter in response to a second variation of said control signal; and varying said altered gain of said first transmitting stage in response to a third variation of said control signal.

It is an object of the present invention is to provide an apparatus for controlling the output power of a wireless handset in an optimal manner.

It is another object of the present invention to provide an apparatus for controlling the output power of a wireless handset that simplifies the overall design of the handset.

It is yet another object of the present invention to provide an apparatus for controlling the output power of a wireless handset that reduces the overall cost of the handset.

It is a further object of the present invention is to provide a method for controlling the output power of a wireless handset in an optimal manner.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The present invention is directed to a CDMA cellular handset with a simplified design for optimally controlling the output power of the handset. The invention comprises an automatic and adjustable power control method and apparatus that utilizes a single control signal to control two frequency diverse variable gain stages of a transmitting portion of the handset by a multi-point handoff technique.

Figure 1:
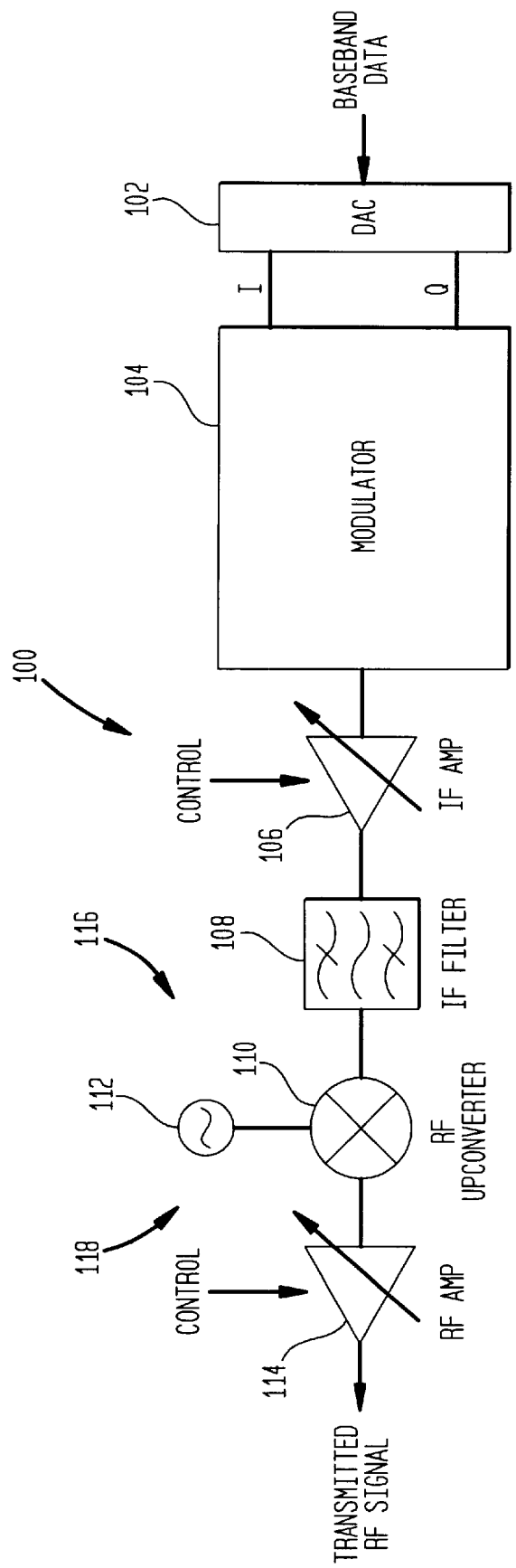
FIG. 1 illustrates an exemplary transmit chain utilized in a CDMA cellular handset.
Figure 2:
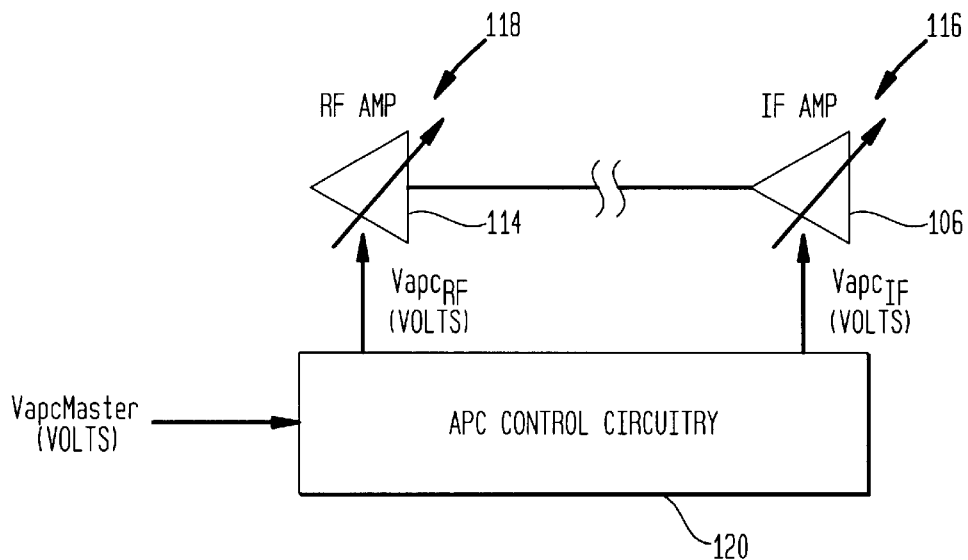
FIG. 2 illustrates an exemplary automatic power control circuit used for controlling the two frequency-diverse variable-gain stages of a transmit chain with a single control signal.
Figure 3:
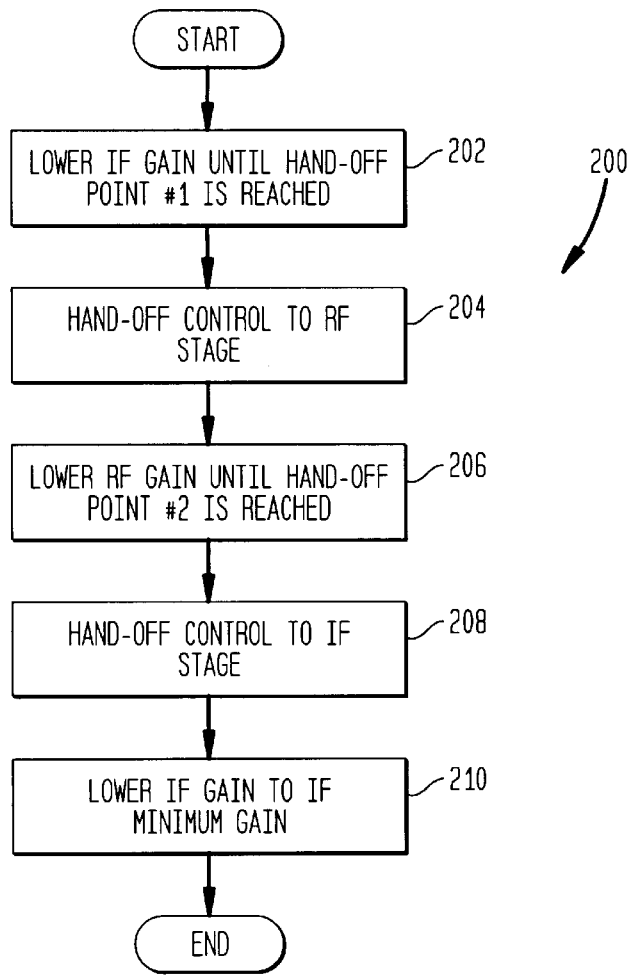
FIG. 3 illustrates in flowchart form an exemplary multi-point hand-off process performed by the present invention.
Figure 5:
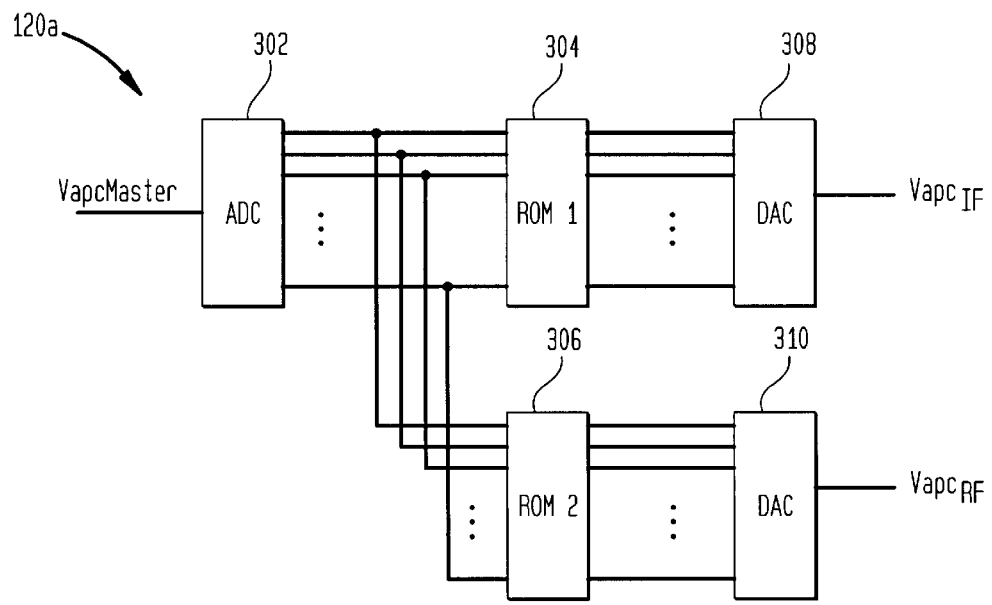
FIGS. 5–7 illustrate exemplary embodiments of an APC circuit for carrying out the multi-point hand-off processing performed by the present invention.

The present invention is preferably implemented in the APC circuit 120 by hardware (described in detail below with reference to FIGS. 5–7). The present invention utilizes a multi-point hand-off technique for controlling the output power of the transmit chain 100. In this multi-point hand-off technique, the IF and RF stages 116, 118 are controlled alternatively. FIG. 3 illustrates an exemplary multi-point hand-off process 200 performed by the present invention. Initially, at step 202, the process 200 would begin by lowering the gain of the IF stage, but only enough to satisfy constraints #3 and #4 described above. The point at which constraints #3 and #4 become satisfied is referred to as hand-off point #1. As will be shown below, the APC control signal VapcMaster will be at a hand-off #1 voltage level APCHandoffLevel$_1$. It must be noted that the IF gain at hand-off point #1 will not be the minimum gain of the IF stage and therefore, the entire IF gain range is not being exercised at step 202. The sequential, simultaneous and comprise methods would have exercised the entire range of the IF stage. Accordingly, the process 200 of the present invention is capable of satisfying constraints #3 and #4.

After reaching hand-off point #1, the process 200 would continue at step 204 by handing-off the power control to the RF stage. At step 206, the gain of the RF stage is lowered from its maximum until constraints #1 and #2 are satisfied. The point at which constraints #1 and #2 become satisfied is referred to as hand-off point #2. As will be shown below, the APC control signal VapcMaster will be at a handoff #2 voltage level APCHandoffLevel$_2$. Preferably, the gain of the RF stage is lowered to its minimum gain. During step 206, the IF gain is not changed while the RF gain is being varied.

After reaching hand-off point #2, the process 200 would continue at step 208 by handing-off the power control to the IF stage. At this point, the IF gain is lowered from the hand-off point #1 gain to its minimum gain (step 210). The process continues at step 202 to maintain the optimal output power control achieved by the present invention.

The gain control of the multi-point hand-off process 200 is performed by the APC circuit as follows:

$G_{Tot}=G_{IF}+G_{RF}=Vapc_{IF}*GS_{IF}+Vapc_{RF}*GS_{RF}$, where $Vapc_{IF}=VapcMaster$, $Vapc_{RF}=Vapc_{RF-min}$ when $VapcMaster_{Min}<VapcMaster<APC\ Handoff\ Level_1$, $Vapc_{IF}=Vapc_{IF-mid}$, $Vapc_{RF}=VapcMaster$ when APC Handoff Level$_1$<VapcMaster<APC Handoff Level$_2$, $Vapc_{IF}=VapcMaster$, $Vapc_{RF}=Vapc_{RF-max}$ when APC Handoff Level$_2$<VapcMaster<VapcMaster$_{Max}$, $GS_{IF}$=the gain slope of the IF stage in dB/V=(total gain range of IF stage)/(control range of the IF stage in Volts) and $GS_{RF}$=the gain slope of the RF stage in dB/V=(total gain range of RF stage)/(control range of the RF stage in Volts).

Figure 4:
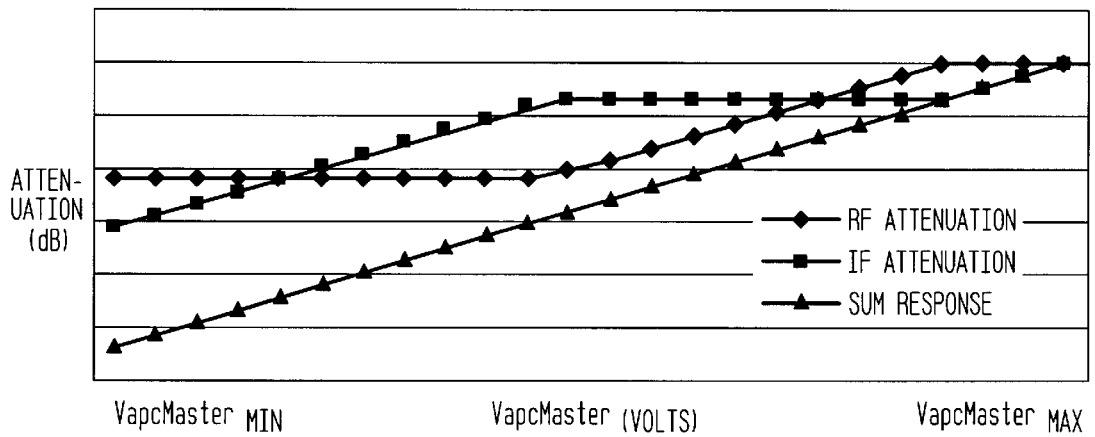
FIG. 4 illustrates the output power control response according to the present invention.

These equations describe the instance where part of the IF gain range is exercised, then all of the RF gain is exercised and then the remaining portion of the IF gain range is exercised by the variation of the APC control signal VapcMaster. This can be seen pictorially in FIG. 4 which illustrates the transmitter output power attenuation (in dB) versus the level of the APC control signal VapcMaster (in volts). As is known in the art, attenuation corresponds to an amount of lessening of the gain.

The invention comprises an automatic and adjustable power control method and apparatus that utilizes a single control signal to control two frequency diverse variable gain stages of a transmitting portion of the handset by a multi-point hand-off technique. By effectively utilizing a single control signal, the present invention is capable of achieving an optimal output power control for the CDMA handset while reducing control circuitry and thus, lessening the design and cost of the handset.

The present invention is preferably implemented in the APC circuit by hardware. FIG. 5 illustrates one exemplary APC circuit 120a implemented using digital circuitry. The circuit 120a includes an analog-to-digital converter (ADC) 302, two memory circuits 304, 306 and two digital-to-analog converters (DAC) 308, 310. The ADC 302 is connected to the APC control signal VapcMaster and has multi-bit outputs connected to the memory circuits 304, 306. The memory circuits 304, 306 can be read-only memory (ROM) or programmable read-only memory (PROM) containing digitally encoded voltage levels. The memory circuits 304, 306 are respectively connected to the two DACs 308, 310. The output of the first DAC 308 is the $Vapc_{IF}$ signal and the output of the second DAC 310 is the $Vapc_{RF}$ as described above. When the analog APC control signal VapcMaster is received, the ADC 302 converts the signal into a digital signal which is applied to the memory circuits 304, 306 to look-up and obtain suitable digital voltage levels for $Vapc_{IF}$ and $Vapc_{RF}$. The two DACs 308, 310 convert the digital voltage signals into analog signals that are applied to the RF and IF stages of the transmit chain.

Figure 6:
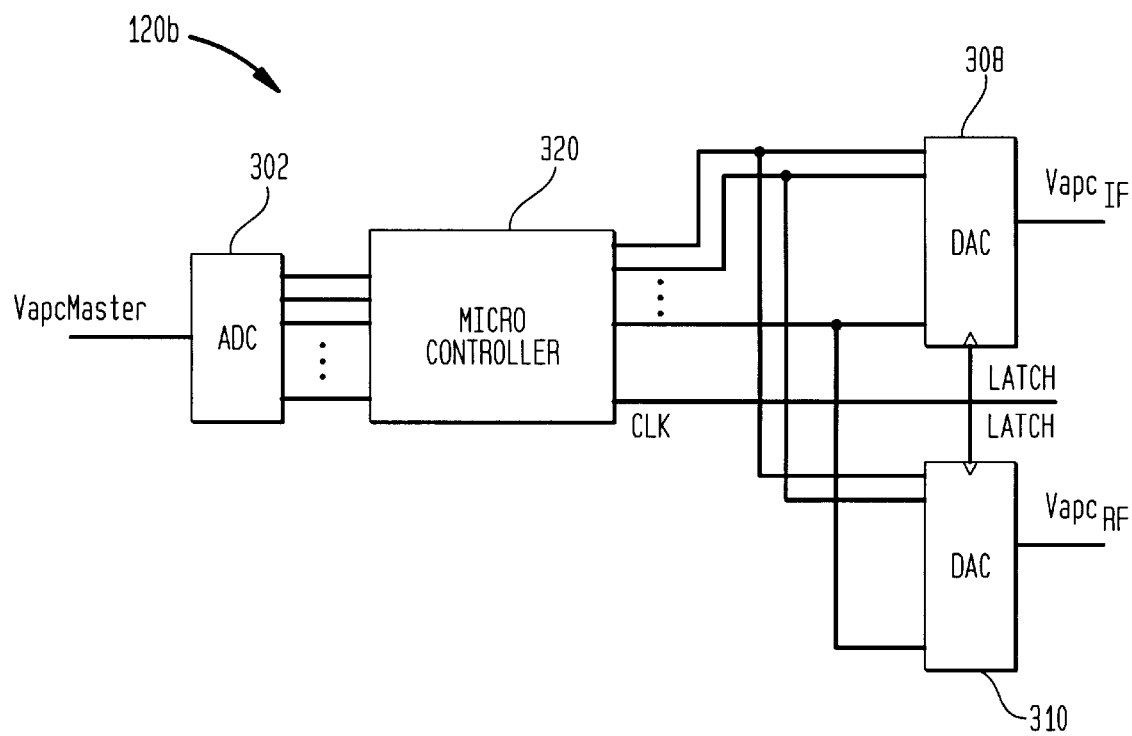

FIG. 6 illustrates a second exemplary APC circuit 120b implemented using digital circuitry. The circuit 120b includes an analog-to-digital converter (ADC) 302, micro-controller 320 and two digital-to-analog converters (DAC) 308, 310. The circuit 120b operates in a similar manner as the circuit 120a (FIG. 5) except that the micro-controller 320 calculates the new voltage levels as opposed to the look-up method used with the memory circuits 304, 306. Since the micro-controller 320 can perform the calculations very fast, the single micro-controller 320 can be used to calculate and output the digital voltage levels for $Vapc_{IF}$ and $Vapc_{RF}$ in an alternating manner (thus, the digital voltages can be latched into the DACs 308, 310).

Figure 7:
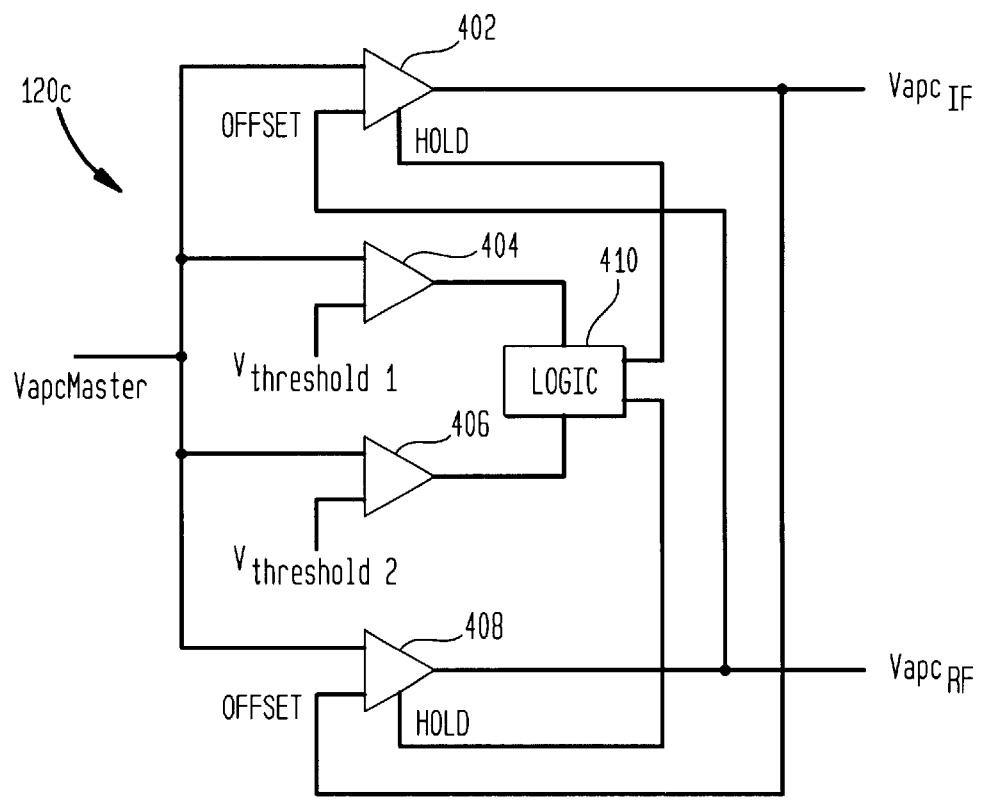

FIG. 7 illustrates an exemplary APC circuit 120c implemented using analog circuitry. The circuit 120c includes four operational amplifiers (op-amps) 402, 404, 406, 408 and a logic circuit 410 that are coupled together to generate suitable analog voltages for $Vapc_{IF}$ and $Vapc_{RF}$ without converting between analog and digital voltages. The APC control signal VapcMaster is applied to an input of all of the op-amps 402, 404, 406, 408. The circuit 120c uses the logic circuit 410 to generate hold or latch signals HOLD which are applied to the first op-amp 402 to maintain or hold the $Vapc_{IF}$ while the RF stage is being exercised and, likewise, to the fourth op-amp 408 to maintain or hold the $Vapc_{RF}$ while the IF stage is being exercised. The logic circuit 410 generates the hold signals HOLD based on the outputs of the second and third op-amps 404, 406 which are comparing the APC control signal VapcMaster to their respective thresholds Vthreshold1, Vthreshold2. These thresholds Vthreshold1, Vthreshold2 are set so that they correspond to the hand-off voltage levels (described above with reference to FIGS. 3 and 4) so that the logic circuit 410 may remove or apply the hold signal HOLD to the appropriate op-amp 402, 408. An offset voltage OFFSET is used to offset the APC control signal VapcMaster so that the $Vapc_{RF}$ and $Vapc_{RF}$ can obtain different minimum (or maximum) voltage levels. The output of the first op-amp 402 is used as the $Vapc_{IF}$ and the output of the fourth op-amp 408 is used as the $Vapc_{RF}$. When the APC control signal VapcMaster is received, the circuit $120_c$ generates the appropriate IF stage voltage $Vapc_{IF}$ and RF stage $Vapc_{RF}$ voltage as described above.

In addition, it must be noted that the present invention may be implemented in software or a combination of hardware and software. The invention may be implemented in any conventional CDMA cellular telephone and is not restricted to any particular CDMA cellular telephone circuit architecture.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by letters patent of the United States is:

1. An automatic and adjustable output power control method for a telephone handset, said method comprising:
providing a control signal;
altering a gain of a first transmitting stage of the handset to satisfy at least one system parameter in response to a first variation of the control signal;
altering a gain of a second transmitting stage of the handset to satisfy at least one additional system parameter in response to a second variation of the control signal; and
varying the altered gain of the first transmitting stage in response to a third variation of the control signal,
wherein a total gain of a transmitting portion of the handset is equal to a summation of the gain of the first transmitting stage and the gain of the second transmitting stage, the gain of the first transmitting stage comprises a product of a voltage of the control signal and a gain slope of the first transmitting stage, the gain slope of the first transmitting stage comprising a division of a gain range of the first transmitting stage by a control voltage range of the first transmitting stage.

2. The method of claim 1 wherein a number of the at least one system parameter is two.

3. The method of claim 1 wherein the first transmitting stage is an intermediate frequency transmitting stage.

4. The method of claim 3 wherein the at least one system parameter comprises a system constraint.

5. The method of claim 4 wherein the system constraint comprises a requirement that the gain of the first transmitting stage is lowered prior to a lowering of the gain of the second transmitting stage.

6. The method of claim 4 wherein the system constraint comprises a requirement that a gain range of the first transmitting stage be extended.

7. The method of claim 1 wherein a number of the at least one additional system parameter is two.

8. The method of claim 1 wherein the second transmitting stage is a radio frequency transmitting stage.

9. The method of claim 8 wherein the at least one additional system parameter comprises an additional system constraint.

10. The method of claim 9 wherein the additional system constraint comprises a requirement that as the gain of the second transmitting stage is lowered a current consumption of the handset is lowered.

11. The method of claim 9 wherein the additional system constraint comprises a requirement that the gain of the second transmitting stage be lowered.

12. The method of claim 1 wherein the control signal is an analog voltage.

13. An automatic and adjustable output power control method for a telephone handset, said method comprising:
providing a control signal;
altering a gain of a first transmitting stage of the handset to satisfy at least one system parameter in response to a first variation of the control signal;
altering a gain of a second transmitting stage of the handset to satisfy at least one additional system parameter in response to a second variation of the control signal; and varying the altered gain of the first transmitting stage in response to a third variation of the control signal,
wherein a total gain of a transmitting portion of the handset is equal to a summation of the gain of the first transmitting stage and the gain of the second transmitting stage and wherein the step of altering a gain of a first transmitting stage is performed by lowering the gain of the first transmitting stage from a first gain to a second gain, the first gain being a maximum gain and the second gain being an intermediate gain of the first transmitting stage, the intermediate gain corresponding to a level of the control signal.

14. The method of claim 13 wherein the step of altering a gain of a second transmitting stage of the handset to satisfy at least one system parameter is performed by lowering the gain of the second transmitting stage from a first gain to a second gain.

15. The method of claim 14 wherein the first gain is a maximum gain and the second gain is a minimum gain of the second transmitting stage.

16. The method of claim 15 wherein the minimum gain corresponds to a level of the control signal.

17. The method of claim 13 wherein the step of varying the altered gain of the first transmitting stage is performed by lowering the altered gain of the first transmitting stage from a first altered gain to a second altered gain.

18. The method of claim 17 wherein the first altered gain is an intermediate gain corresponding to a first level of the control signal and the second altered gain is a minimum gain of the first transmitting stage.

19. The method of claim 18 wherein the minimum gain corresponds to a second level of the control signal.

20. The method of claim 13 wherein the gain of the second transmitting stage comprises a product of a voltage of the control signal and a gain slope of the second transmitting stage.

21. The method of claim 20 wherein the gain slope of the second transmitting stage comprises a division of a gain range of the second transmitting stage by a control voltage range of the second transmitting stage.

22. An apparatus for providing automatic and adjustable output power control to a transmitting portion of a telephone handset comprising:
a controller coupled to the transmitting portion of the handset, said controller receiving a control signal from a second portion of the handset, said controller:
altering a gain of a first transmitting stage of the transmitting portion to satisfy at least one system parameter in response to a first variation of said control signal;
altering a gain of a second transmitting stage of the transmitting portion to satisfy at least one additional system parameter in response to a second variation of said control signal; and
varying said altered gain of the first transmitting stage in response to a third variation of said control signal,
wherein a total gain of the transmitting portion is equal to a summation of said gain of the first transmitting stage and said gain of the second transmitting stage, and said controller alters a gain of a second transmitting stage by lowering said gain of the second transmitting stage from a first gain to a second gain, said first gain being a maximum gain and said second gain being a minimum gain of the second transmitting stage, said minimum gain corresponding to a level of said control signal.

23. The apparatus of claim 22 wherein a number of said at least one system parameter is two.

24. The apparatus of claim 22 wherein the first transmitting stage is an intermediate frequency transmitting stage.

25. The apparatus of claim 24 wherein said at least one system parameter comprises a system constraint.

26. The apparatus of claim 25 wherein said system constraint comprises a requirement that said gain of the first transmitting stage is lowered prior to a lowering of said gain of the second transmitting stage.

27. The apparatus of claim 25 wherein said system constraint comprises a requirement that a gain range of the first transmitting stage be extended.

28. The apparatus of claim 22 wherein a number of said at least one additional system parameter is two.

29. The apparatus of claim 22 wherein the second transmitting stage is a radio frequency transmitting stage.

30. The apparatus of claim 29 wherein said at least one additional system parameter comprises an additional system constraint.

31. The apparatus of claim 30 wherein said additional system constraint comprises a requirement that as said gain of the second transmitting stage is lowered a current consumption of the transmitting portion is lowered.

32. The apparatus of claim 30 wherein said additional system constraint comprises a requirement that said gain of the second transmitting stage be lowered.

33. The apparatus of claim 22 wherein said control signal is an analog voltage.

34. An apparatus for providing automatic and adjustable output power control to a transmitting portion of a telephone handset comprising:
a controller coupled to the transmitting portion of the handset, said controller receiving a control signal from a second portion of the handset, said controller:
altering a gain of a first transmitting stage of the transmitting portion to satisfy at least one system parameter in response to a first variation of said control signal;
altering a gain of a second transmitting stage of the transmitting portion to satisfy at least one additional system parameter in response to a second variation of said control signal; and
varying said altered gain of the first transmitting stage in response to a third variation of said control signal,
wherein a total gain of the transmitting portion is equal to a summation of said gain of the first transmitting stage and said gain of the second transmitting stage and said controller alters a gain of a first transmitting stage by lowering said gain of the first transmitting stage from a first gain to a second gain, said first gain being a maximum gain and said second gain being an intermediate gain of the first transmitting stage, said intermediate gain corresponding to a level of said control signal.

35. The apparatus of claim 34 wherein said controller varies said altered gain of the first transmitting stage by lowering said altered gain from a first altered gain to a second altered gain.

36. The apparatus of claim 35 wherein said first altered gain is an intermediate gain corresponding to a first level of said control signal and said second altered gain is a minimum gain of the first transmitting stage.

37. The apparatus of claim 36 wherein said minimum gain corresponds to a second level of said control signal.

38. The apparatus of claim 34 wherein said gain of the first transmitting stage comprises a product of a voltage of the control signal and a gain slope of the first transmitting stage.

39. The apparatus of claim 38 wherein said gain slope of the first transmitting stage comprises a division of a gain range of the first transmitting stage by a control voltage range of the first transmitting stage.

40. The apparatus of claim 39 wherein said gain of the second transmitting stage comprises a product of a voltage of said control signal and a gain slope of the second transmitting stage.

41. The apparatus of claim 40 wherein said gain slope of the second transmitting stage comprises a division of a gain range of the second transmitting stage by a control voltage range of the second transmitting stage.

42. A telephone handset comprising:
a first controller providing a control signal;
a transmitting circuit, said transmitting circuit including first and second transmitting stages, said transmitting circuit having an output power; and
a power control circuit coupled to said transmitting circuit and said first controller, said power control circuit comprising:
a second controller coupled to said first and second transmitting stages receiving said control signal from said first controller, said second controller:
altering a gain of said first transmitting stage to satisfy at least one system parameter in response to a first variation of said control signal;
altering a gain of said second transmitting stage to satisfy at least one additional system parameter in response to a second variation of said control signal; and
varying said altered gain of said first transmitting stage in response to a third variation of said control signal,
wherein a total gain of said transmitting circuit is equal to a summation of said gain of said first transmitting stage and said gain of said second transmitting stage, said gain of said second transmitting stage comprises a product of a voltage of said control signal and a gain slope of said second transmitting stage, and said gain slope of said second transmitting stage comprises a division of a gain range of said second transmitting stage by a control voltage range of said second transmitting stage.

43. The handset of claim 42 wherein a number of said at least one system parameter is two.

44. The handset of claim 42 wherein said first transmitting stage is an intermediate frequency transmitting stage.

45. The handset of claim 44 wherein said at least one system parameter comprises a system constraint.

46. The handset of claim 45 wherein said system constraint comprises a requirement that said gain of said first transmitting stage is lowered prior to a lowering of said gain of said second transmitting stage.

47. The handset of claim 45 wherein said system constraint comprises a requirement that a gain range of said first transmitting stage be extended.

48. The handset of claim 42 wherein a number of said at least one additional system parameter is two.

49. The handset of claim 42 wherein said second transmitting stage is a radio frequency transmitting stage.

50. The handset of claim 49 wherein said at least one additional system parameter comprises an additional system constraint.

51. The handset of claim 50 wherein said additional system constraint comprises a requirement that as said gain of said second transmitting stage is lowered a current consumption of said transmitting circuit is lowered.

52. The handset of claim 50 wherein said additional system constraint comprises a requirement that said gain of said second transmitting stage be lowered.

53. The handset of claim 42 wherein said control signal is an analog voltage.

54. A telephone handset comprising:
a first controller providing a control signal;
a transmitting circuit, said transmitting circuit including first and second transmitting stages, said transmitting circuit having an output power; and
a power control circuit coupled to said transmitting circuit and said first controller, said power control circuit comprising:
a second controller coupled to said first and second transmitting stages receiving said control signal from said first controller, said second controller:
altering a gain of said first transmitting stage to satisfy at least one system parameter in response to a first variation of said control signal;
altering a gain of said second transmitting stage to satisfy at least one additional system parameter in response to a second variation of said control signal; and
varying said altered gain of said first transmitting stage in response to a third variation of said control signal,
wherein a total gain of said transmitting circuit is equal to a summation of said gain of said first transmitting stage and said gain of said second transmitting stage, said second controller alters a gain of said second transmitting stage by lowering said gain of said second transmitting stage from a first gain to a second gain, said first gain being a maximum gain and said second gain being a minimum gain of said second transmitting stage, and wherein said minimum gain corresponds to a level of said control signal.

55. The handset of claim 54 wherein said second controller alters a gain of said first transmitting stage by lowering said gain of said first transmitting stage from a first gain to a second gain.

56. The handset of claim 55 wherein said first gain is a maximum gain and said second gain is an intermediate gain of said first transmitting stage.

57. The handset of claim 56 wherein said intermediate gain corresponds to a level of said control signal.

58. The handset of claim 54 wherein said second controller varies said altered gain of said first transmitting stage by lowering said altered gain from a first altered gain to a second altered gain.

59. The handset of claim 58 wherein said first altered gain is an intermediate gain corresponding to a first level of said control signal and said second altered gain is a minimum gain of said first transmitting stage.

60. The handset of claim 51 wherein said minimum gain corresponds to a second level of said control signal.

61. The handset of claim 54 wherein said gain of said first transmitting stage comprises a product of a voltage of the control signal and a gain slope of said first transmitting stage.

62. The handset of claim 61 wherein said gain slope of said first transmitting stage comprises a division of a gain range of said first transmitting stage by a control voltage range of said first transmitting stage.

* * * * *